(12) United States Patent
Yoshida

(10) Patent No.: US 7,316,454 B2
(45) Date of Patent: Jan. 8, 2008

(54) HEIGHT-ADJUSTING DEVICE FOR AUTOMOBILE SEAT

(75) Inventor: Masami Yoshida, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 10/554,127

(22) PCT Filed: Apr. 21, 2004

(86) PCT No.: PCT/JP2004/005722

§ 371 (c)(1), (2), (4) Date: Feb. 7, 2007

(87) PCT Pub. No.: WO2004/094181

PCT Pub. Date: Nov. 4, 2004

(65) Prior Publication Data
US 2007/0158988 A1 Jul. 12, 2007

(30) Foreign Application Priority Data
Apr. 21, 2003 (JP) .............................. 2003-115957

(51) Int. Cl.
B60N 2/16 (2006.01)
(52) U.S. Cl. .............................. 297/344.14; 297/344.15
(58) Field of Classification Search ........... 297/344.12, 297/344.15, 344.14
See application file for complete search history.

(56) References Cited

U.S. PATENT DOCUMENTS 2,239,917 A * 4/1941 Hunter et al. ................ 248/394
6,217,115 B1 4/2001 Downey et al.

FOREIGN PATENT DOCUMENTS

| DE | 4302329 A1 * | 8/1994 |
| JP | 357095224 A * | 6/1982 |
| JP | 2001138780 | 5/2001 |
| WO | WO9736766 | 10/1997 |

* cited by examiner

Primary Examiner—Joe Edell
(74) Attorney, Agent, or Firm—Dann, Dorfman, Herrell and Skillman, P.C.

(57) ABSTRACT

Ends of each supporting pin are projected to both sides of each link plate. Each supporting shaft is fixed by welding to each link plate at a position near one end side of the plate. A pipe-like connecting shaft is axis-aligned to and fitted on an end portion of the supporting pin which projects inward from each link plate, so as to be supported between link plates. An end portion of the supporting pin which projects outward from each link plate is passed through a side frame section and fixedly riveted over. Further, each link plate is fixed by welding to both ends of the connecting shaft, and a link base frame is assembled between side frame sections.

4 Claims, 4 Drawing Sheets

HEIGHT-ADJUSTING DEVICE FOR AUTOMOBILE SEAT

FIELD OF THE INVENTION

The present invention relates to a height adjusting device for a vehicle seat, which can adjust a height of the entire vehicle seat.

BACKGROUND OF THE INVENTION

As a height adjusting device for a vehicle seat, there is known a height adjusting device for a vehicle seat, which includes two pairs of spaced apart forward and rearward linkage members bridged between side frame sections of a seat cushion frame of the vehicle seat and two pairs of spaced apart brackets of upper rail members of a track mechanism for allowing the vehicle seat to be slid forward and rearward in an interior of a vehicle, a first connecting shaft interconnecting the rearward linkage members and supported to the side frame sections of the seat cushion frame, a second connecting shaft interconnecting the forward linkage members and supported to the side frame sections, and an operating knob attached to one of the side frame sections of the seat cushion frame, and which is adapted to cause a height of the vehicle seat to be moved vertically by operating the operating knob (Japanese Patent Application Laid-Open No. 2001-138780).

The height adjusting device further includes a pinion gear arranged within the seat cushion frame, a sector gear pivotally supported through a supporting pin to the side frame section of the seat cushion frame and meshed with the pinion gear, and a linkage rod coupled at one end thereof to a portion of the sector gear which is offset from the supporting pin of the sector gear, and coupled at the other end thereof to one of the rearward linkage members.

In the height adjusting device, the first connecting shaft for interconnection of the rearward linkage members is formed of a pipe and the rearward linkage members are supported to the first connecting shaft which is bridged between the spaced apart side frame sections of the seat cushion frame.

However, in the conventional height adjusting device, it will take a lot of labor to cause the rearward linkage members to be held in position to the first connecting shaft, and cause the first connecting shaft to be supported to the side frame sections of the seat cushion frame. In addition, the first connecting shaft is not supported to the side frame sections with reliability.

SUMMARY OF THE INVENTION

It is therefore an object of the present invention to provide a height adjusting device for adjusting a height of a vehicle seat, in which a pair of rearward linkage members can be easily held in position to a connecting shaft and the connecting shaft can be easily supported to a pair of spaced apart side frame sections of a seat cushion frame with reliability.

In accordance with the present invention, there is provided a height adjusting device for adjusting a height of a vehicle seat. The vehicle seat includes a seat cushion frame supported through first and second pairs of spaced apart brackets. The seat cushion frame has first and second spaced apart side frame sections. The height adjusting device comprises two pairs of forward and rearward linkage members, the forward linkage members being bridged between first portions of the side frame sections and the first pair of the spaced apart brackets, the rearward linkage members being bridged between second portions of the side frame sections and the second pair of the spaced apart brackets, a connecting shaft rotatably supported to coupling the side frame sections, the rearward linkage members being supported by the connecting shaft, and an operating knob attached to the first side frame section for causing the forward and rearward linkage members to be actuated, thereby causing the vehicle seat to be vertically moved. The height adjusting device further includes supporting pins having first end portions and second end portions, the first end portions of the supporting pins being penetrated through the rearward linkage members, welded to the rearward linkage members and fitted in both ends of the connecting shaft, the second end portions of the supporting pins being penetrated through the spaced apart side frame sections and riveted over. The rearward linkage members are welded to the connecting shaft.

DETAILED DESCRIPTION OF THE PREFERRED EMBODIMENT

Figure 1:
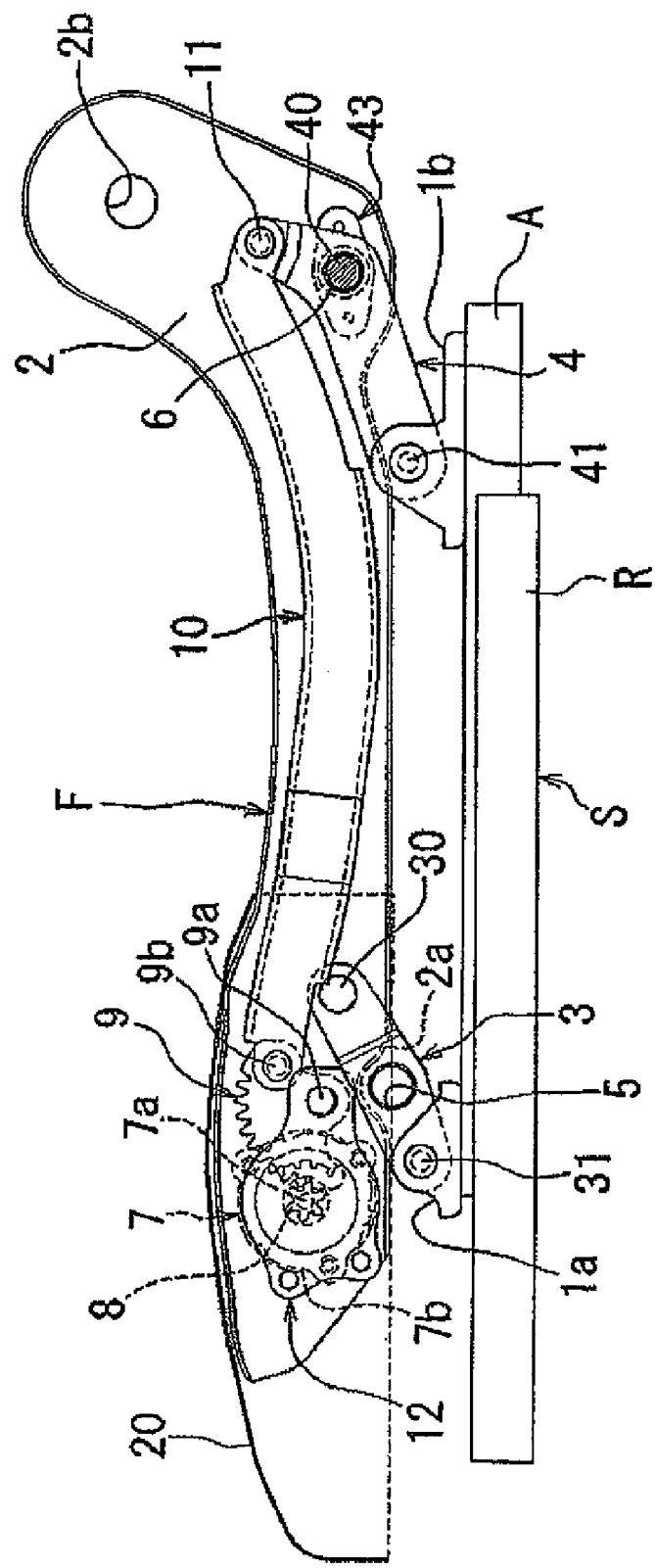
FIG. 1 is a schematic side view of a height adjusting device for adjusting a height of a vehicle seat, according to the present invention, in which the vehicle seat is in a lowered condition.

Now, a height adjusting device for a vehicle seat, according to the present invention, will be discussed hereinafter with reference to the accompanying drawings. Referring to FIG. 1, a vehicle seat to which the height adjusting device according to the present invention is applied is constructed so as to be slidable forward and rearward through a track mechanism S in an interior of a vehicle. The track mechanism S comprises a pair of lower rail members R spaced apart from each other and mounted on a vehicle floor in parallel with each other (only one lower rail member R is shown in FIG. 1), and a pair of upper rail members A, each of which is slidably supported to a corresponding lower rail member R (only one upper rail member A is shown in FIG. 1).

The vehicle seat includes a seat cushion frame F. A seat back (not shown) is pivotally supported to the seat cushion frame F through recliner means (not shown). The seat cushion frame F comprises a pair of spaced apart side frame sections 2 (only one side frame section 2 is shown in FIG. 1), and a pan frame section 20 arranged between forward portions of the spaced apart side frame sections 2 and attached to the forward portions of the side frame sections 2. A first pipe-shaped connecting shaft 6 is arranged between rearward portions of the spaced apart side frame sections 2 and connected to the rearward portions of the spaced apart side frame sections 2. The side frame sections 2 are formed so as to extend upwardly at the rearward portions thereof in which holes 2b (only one hole 2b is shown in FIG. 1) are formed. Ends of a supporting shaft (not shown) for the recliner means are to be inserted in the holes 2b. The seat back includes a pair of spaced apart side frame sections. The spaced apart side frame sections of the seat back are supported to the supporting shaft for the recliner means. Thus, the seat back is pivotally supported to the seat cushion frame F so as to be pivotable forward and rearward relative to the seat cushion.

Each of the upper rail members A of the track mechanism S includes a pair of forward and rearward brackets 1a, 1b rising up from the upper rail member A. The height adjusting device includes two pairs of forward first and rearward linkage members 3, 4. Each of the forward linkage members 3 is arranged between corresponding one of the side frame sections 2 of the seat cushion frame F and the forward bracket 1a of corresponding one of the upper rail members A. Similarly, each of the rearward linkage members 4 is arranged between corresponding one of the side frame sections 2 of the seat cushion F and the rearward bracket 1b of corresponding one of the upper rail members A. The forward linkage members 3 are coupled through a second connecting shaft 5 to each other. Similarly, the rearward linkage members 4 are coupled through the first connecting shaft 6 to each other.

The forward linkage members 3 are formed into substantially linear shapes and supported at one ends thereof to the side frame sections 2 by supporting pins 30 and at the other ends thereof to the forward brackets 1a of the upper rail members A by supporting pins 31. Moreover, the forward linkage members 3 are connected at substantially middle regions thereof to each other through the second connecting shaft 5. The side frame sections 2 of the seat cushion frame F are formed in lower surfaces thereof with notches 2a which allow the second connecting shaft 5 to be moved synchronously with pivotal movement of the forward linkage members 3. Each of the notches 2a is formed into a substantially circular arc-shape.

Each of the rearward linkage members 4 is formed into a substantially L-shape. The rearward linkage members 4 are supported at substantially middle portions thereof to the side frame sections 2 by supporting pins 40 that project from both ends of the first connecting shaft 6. One ends of the rearward linkage members 4 are connected to the rearward brackets 1b of the upper rail members A by supporting pins 41.

The height adjusting device for the vehicle seat further includes an operating knob 7 having a rotating shaft 7a and mounted on an outer surface of one of the side frame sections 2 with the rotating shaft 7a penetrating through the side frame section 2 and projecting into the seat cushion frame F, a pinion gear 8 arranged within an inside of the seat cushion frame F and mounted on the rotating shaft 7a of the operating knob 7 that is projected in the seat cushion frame F through the side frame section 2, a sector gear 9 rotatably supported to the side frame section 2 by a supporting pin 9a and meshed with the pinion gear 8, and a linkage rod 10 arranged between the sector gear 9 and one of the rearward linkage members 4 that is arranged on the side of the side frame 2 to which the operating knob 7 is mounted.

Figure 2:
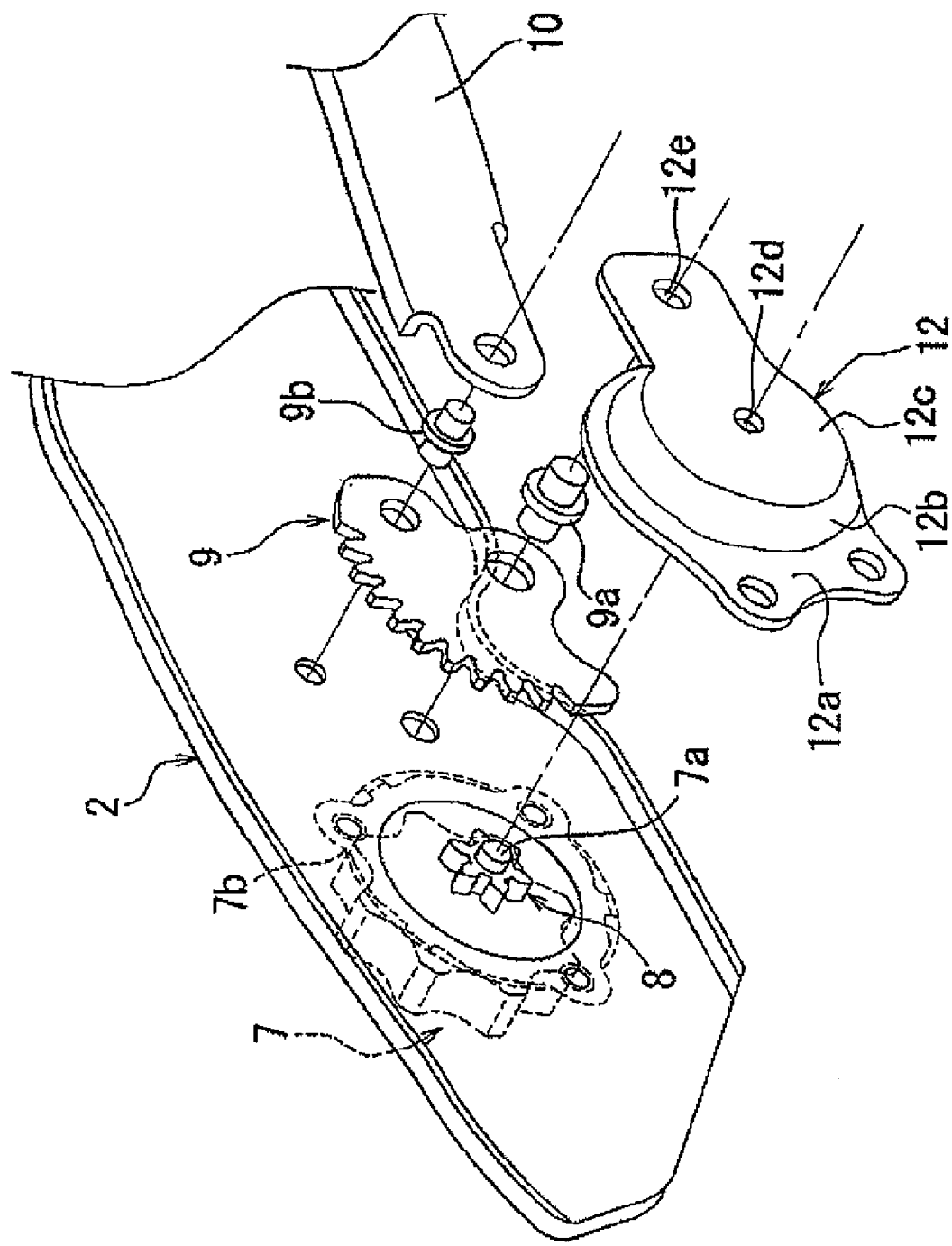
FIG. 2 is a schematic exploded perspective view illustrating a pinion gear and a sector gear which are components for the height adjusting device shown in FIG. 1.

In the illustrated embodiment, as the operating knob 7, an operating knob that is of a dial-type is employed. Referring to FIG. 2, the operating knob 7 includes a body supporting the rotating shaft 7a and a mounting section 7b of a plate shape, and is arranged on the outer surface of the side frame section 2 with the mounting section 7b being attached onto the outer surface of the side frame section 2 and with the rotating shaft 7a being penetrated through the side frame section 2. The operating knob body is constructed so as to be rotatable relative to the mounting section 7b.

The sector gear 9 is rotatably supported at a base portion thereof to the side frame section 2 by the supporting pin 9a and coupled at a portion thereof that is offset from the supporting pin 9a, to one end of the linkage rod 10 by a supporting pin 9b. As shown in FIG. 1, the other end of the linkage rod 10 is coupled to an upper end of the one of the rearward linkage members 4 by a supporting pin 11.

Figure 3:
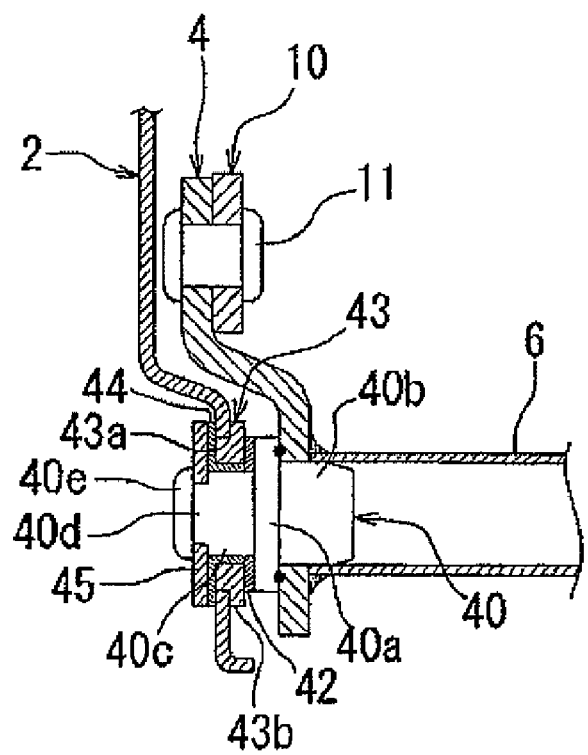
FIG. 3 is a schematic sectional view illustrating a combination of a connecting shaft and a supporting pin which are components for the height adjusting device shown in FIG. 1.

Referring now to FIG. 3, inner end portions of the supporting pins 40 (only one supporting pin 40 is shown in FIG. 3) for the first connecting shaft 6 are inserted through the rearward linkage members 4 in the ends of the first connecting shaft 6, and the first connecting shaft 6 is welded to the rearward linkage members 4. Outer end portions of the supporting pins 40 are penetrated through the side frame sections 2 so as be rotatable relative to the side frame sections 2, so that the supporting pins 40 act as supports for pivotal movement of the rearward linkage members 4.

Figure 4:
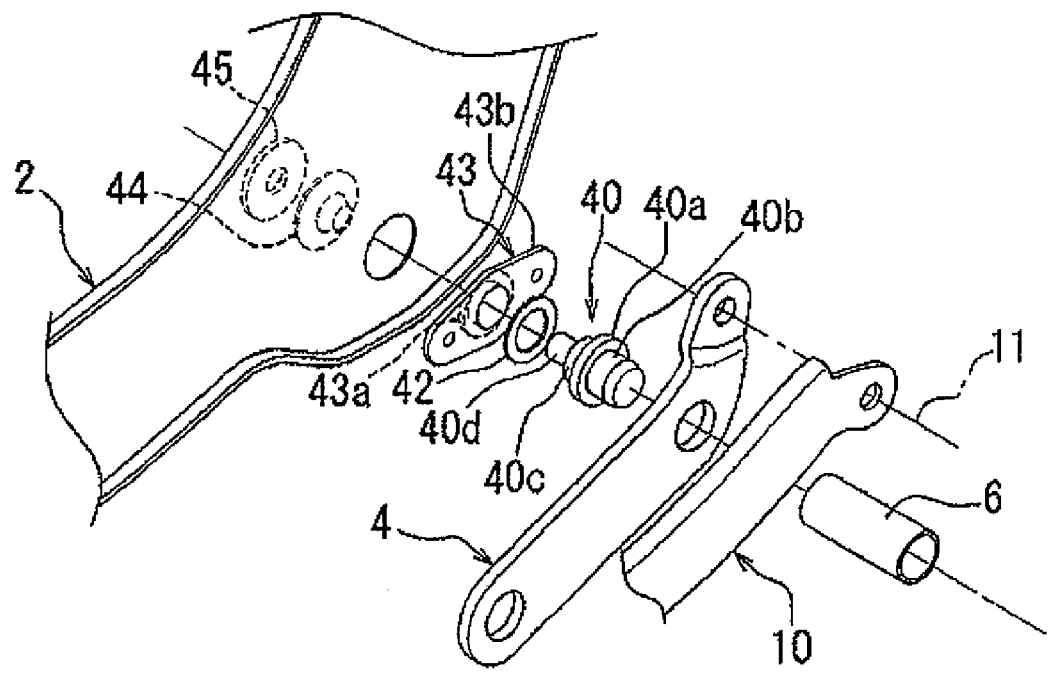
FIG. 4 is a schematic exploded perspective view illustrating the connecting shaft and the supporting pin which are shown in FIG. 3.

Referring to FIG. 4, each of the supporting pins 40 (only one supporting pin 40 is shown in FIG. 4) includes a circumferential flange portion 40a provided between the inner end portion 40b extending inwardly from the circumferential flange portion 40a and inserted in corresponding one of the ends of the first connecting shaft 6 through corresponding one of the rearward linkage members 4, and the outer end portion extending outwardly from the circumferential flange portion 40a and penetrating through corresponding one of the side frame sections 2. The outer end portion of the supporting pin 40 comprises a large diameter region 40c and a relatively small diameter region 40d. The small diameter region 40d of the supporting pin 40 is to be riveted over after the outer end portion of the supporting pin 40 is penetrated through the side frame section 2.

In order to cause the outer end portion of the supporting pin 40 to be securely held in to the corresponding side frame section 2, a first washer 42, a bearing collar 43, a bushing 44, and a second washer 45 are employed. The bearing collar 43 comprises a boss portion 43a and a pair of wings portions 43b laterally extending in directions opposite to each other from the boss portion 43a. The bearing collar 43 is mounted on the inner surface of the side frame section 2 with the boss portion 43a being fitted in a hole of the side frame section 2 and with the wing portions 43b being welded to the side frame section 2.

Now, a procedure for coupling an end of the first connecting shaft 6 to the corresponding rearward linkage member 4 and the corresponding side frame section 2 through the supporting pin 40 will be discussed in greater detail hereinafter. First of all, the inner end portion 40b of the supporting pin 40 is penetrated through the rearward linkage member 4 in such a manner that the circumferential flange portion 40a of the supporting pin 40 is applied onto an outer surface of the rearward linkage member 4. Then, the circumferential flange portion 40a of the supporting pin 40 is welded onto the outer surface of the rearward linkage member 4 by projection welding (see FIG. 3).

The end of the first connecting shaft 6 is then fitted over the inner end portion 40b of the supporting pin 40 welded to the rearward linkage member 4. The first washer 42 and the boss portion 43a of the bearing collar 43 are fitted over the outer end portion of the supporting pin 40 which projects outward from the end of the first connecting shaft 6. Then, the outer end portion of the supporting pin 40 is inserted through a hole of the side frame section 2.

The bushing 44 is then fitted over the outer end portion of the supporting pin 40 that has been projected outward of the side frame 2, and fitted into the boss portion 43a of the bearing collar 43 through the hole of the side frame section 2. The second washer 45 is then mounted on the outer end portion of the supporting pin 40. Thereafter, the small diameter portion 40d of the supporting pin 40 is riveted over the second washer 45 as a riveted portion 40e (see FIG. 3). Moreover, the first connecting shaft 6 is welded to the rearward linkage member 4. The other end of the first connecting shaft 6 is connected to the other of the side frame sections 2 in the same manner as the one end of the first connecting shaft 6 is connected to the one of the side frame sections 2. Thus, the first connecting shaft 6 is rotatable relative to the side frame sections 2.

As described above, first of all, the inner end portions 40b of the supporting pins 40 are penetrated through the rearward linkage members 4 and then welded to the rearward linkage members 4. The ends of the first connecting shaft 6 are then fitted over the inner end portions 40b of the supporting pins 40 welded to the rearward linkage members 4. In this way, a combination that comprises the first connecting shaft 6 and the rearward linkage members 4 attached in position to the first connecting shaft 6 is assembled. Thereafter, the outer end portions of the supporting pins are connected to the side frame sections 2 and riveted over. Therefore, the rearward linkage members 4 can be easily supported in position to the first connecting shaft 6 and the second connecting shaft 5 can be easily and reliably supported to the side frame sections 2.

As shown in FIG. 2, a gear cover 12 for covering the pinion gear 8 and the sector gear 9 is provided. The gear cover 12 comprises a base portion 12a, a substantially cylindrical-shaped portion 12b projecting laterally from the base portion 12a, and a top portion 12c lying on the substantially cylindrical-shaped portion 12b and extending laterally from the substantially cylindrical-shaped portion 12b. The top portion 12c is formed with a first hole 12d and a second hole 12e in which the rotating shaft 7a of the operating knob 7 and the supporting pin 9a of the sector gear 9 are respectively inserted.

The gear cover 12 is secured on an inner surface of the side frame section 2 with the cylindrical-shaped portion 12b and top portion 12c covering the pinion gear 8 and the sector gear 9, with the base portion 12a being mounted on the inner surface of the side frame section 2, and with the first and second holes 12d, 12e of the gear cover 12 receiving the rotating shaft 7a of the operating knob 7 and the supporting pin 9a of the sector gear 9, respectively. Thus, the pinion gear 8 and the sector gear 9 are arranged between the side frame section 2 and the gear cover 12 so as not to be exposed. In addition, the rotating shaft 7a of the operating knob 7 and the supporting shaft 9a of the sector gear 9 are supported by both the side frame section 2 and the gear cover 12 at their opposite ends.

In the height adjusting device constructed as discussed above, in a condition where the vehicle seat is lowered as shown in FIG. 1, the linkage rod 10 is thrust rearward by the sector gear 9 and the first and rearward linkage members 3, 4 are collapsed rearward.

Figure 5:
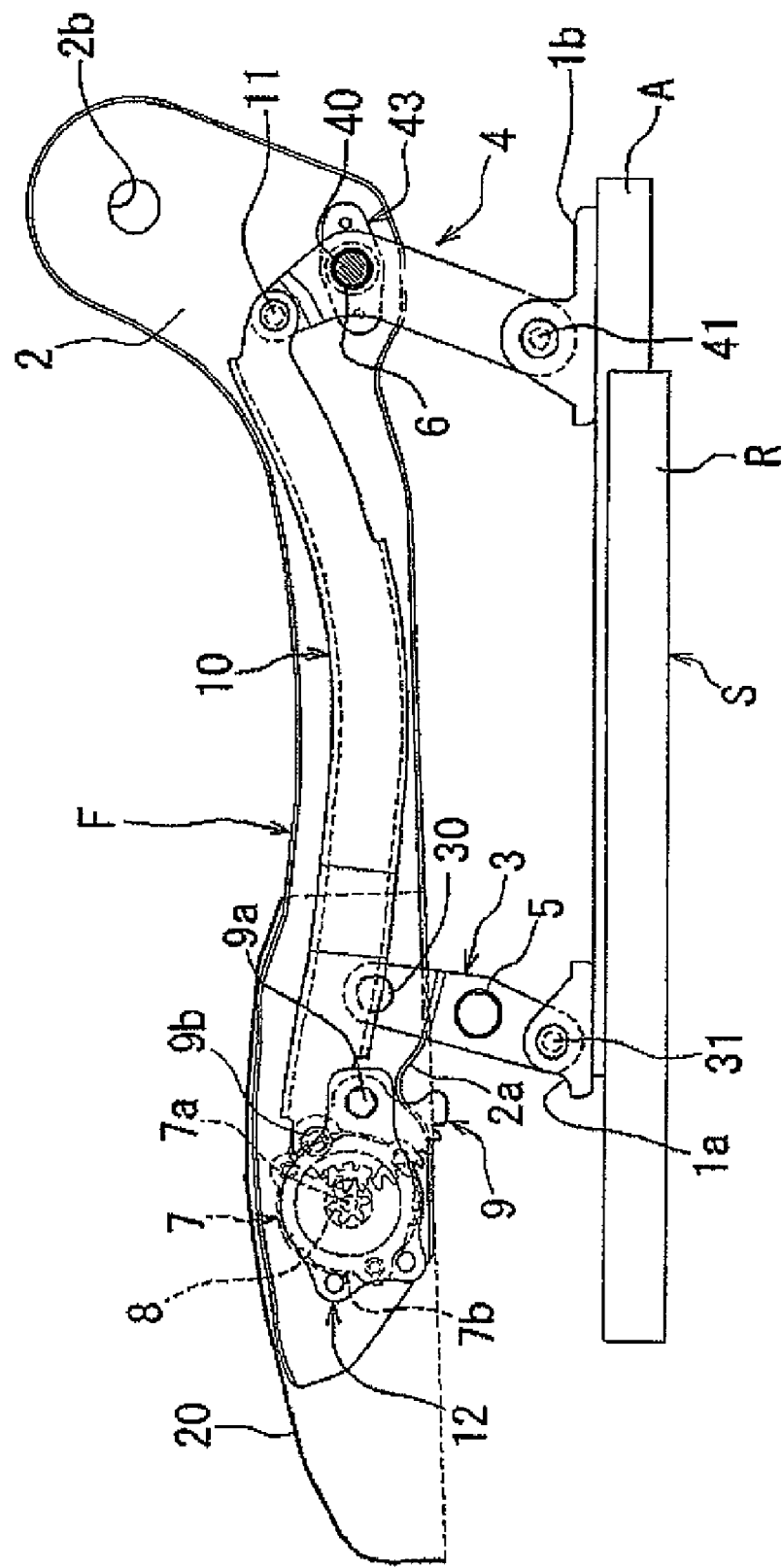
FIG. 5 is a schematic side view of the height adjusting device of FIG. 1, in which the vehicle seat is in a lifted-up condition.

In this condition, when the body of the operating knob 7 is rotated in a predetermined direction, the pinion gear 8 is simultaneously rotated. Synchronously with the rotation of the pinion gear 8, the sector gear 9 is rotated about the supporting pin 9a in a counterclockwise direction in. FIG. 1, whereby the linkage rod 10 is drawn forward. Simultaneously with the forward movement of the linkage rod 10, the rearward linkage members 4 are rotated around the supporting pins 41 so as to operatively stand up and the forward linkage members 3 are also rotated around the supporting pins 31 so as to operatively stand up. Thus, the vehicle seat is lifted up as shown in FIG. 5.

The rearward linkage members 4 are supported to the side frame sections 2 through the supporting pins 40 coupled to the ends of the first connecting shaft 6, so that the first and rearward linkage members 3, 4 can be stably moved during adjusting of the height of the vehicle seat. Moreover, the pinion gear 8 and the sector gear 9 are arranged between the side frame section 2 and the gear cover 12 so as to be covered by the gear cover 12, so that any foreign materials can be prevented from being caught between the pinion gear 8 and the sector gear 9. In addition, the rotating shaft 7a of the operating knob 7 that supports the pinion gear 8, and the supporting pin 9a supporting the sector gear 9 are supported by both the side frame section 2 and the gear cover 12 at their opposite ends, so that the sector gear 9 can be securely prevented from being deflected, namely, producing runout. Therefore, the sector gear 9 can be stably and positively rotated by the pinion gear.

What is claimed is:

1. A height adjusting device for adjusting a height of a vehicle seat, said vehicle seat including a seat cushion frame having a pair of first and second spaced apart side frame sections, and first and second pairs of spaced apart brackets, said height adjusting device comprising:
   two pairs of forward and rearward linkage members;
   said forward linkage members being bridged between first portions of said side frame sections and said first pair of spaced apart brackets;
   said rearward linkage members being bridged between second portions of said side frame sections and said second pair of spaced apart brackets;
   a first cylindrical connecting shaft rotatably supported to said side frame sections;
   said first connecting shaft having a first end and a second end;
   said rearward linkage members being supported by said first connecting shaft;
   a second connecting shaft rotatably supported to said frame sections;
   said forward linkage members being supported by said second connecting shaft;
   an actuating mechanism arranged on an inner surface of said first side frame section for actuating said forward and rearward linkage members;
   an operating knob attached to an outer surface of said first side frame section and coupled through said first side frame section to said actuating mechanism for causing said actuating mechanism to be actuated, to thereby cause said vehicle seat to be vertically moved;
   a first supporting pin comprising a first end portion, a second end portion, and a first circumferential flange portion provided between said first and second end portions;
   said second end portion of said first supporting pin comprising a first large diameter region and a first relatively small diameter region; and
   a second supporting pin comprising a third end portion, a fourth end portion, and a second circumferential flange portion provided between said third and fourth end portions;
   said fourth end portion of said second supporting pin comprising a second large diameter region and a second relatively small diameter region;

said first end portion of said first supporting pin being penetrated through one of said rearward linkage members with said first circumferential flange portion thereof contacting an outer surface of said one of said rearward linkage members and welded to said outer surface of said one of said rearward linkage members;

said first end of said first connecting shaft being fitted over said first end portion of said first supporting pin so as to contact an inner surface of said one of said rearward linkage members and welded to said inner surface;

said second end portion of said first supporting pin being penetrated through said first side frame section and riveted at said first relatively small diameter region thereof over said outer surface of said first side frame section;

said third end portion of said second supporting pin being penetrated through a second of said rearward linkage members with said second circumferential flange portion thereof contacting an outer surface of said second of said rearward linkage members and welded to said outer surface of the second of said rearward linkage members;

said second end of said first pipe-shaped connecting shaft being fitted over said third end portion of said second supporting pin so as to contact an inner surface of said other of said rearward linkage members and welded to said inner surface of said other of said rearward linkage members; and said fourth end portion of said second supporting pin being penetrated through said second side frame section and riveted at said second relatively small diameter region thereof over an outer surface of said second side frame section.

2. A height adjusting device according to claim 1, wherein said first circumferential flange portion of said first supporting pin is welded to the surface of the one of said rearward linkage members by projection welding, and said second circumferential flange portion of said second supporting pin is welded to the surface of the second of said rearward linkage members by projection welding.

3. A height adjusting device according to claim 1, wherein said vehicle seat is provided with a track mechanism for allowing said vehicle seat to be moved forward and rearward in an interior of a vehicle, said track mechanism comprising a pair of spaced apart lower rail members mounted on a vehicle floor and a pair of upper rail members slidably supported to said lower rail members, and said first and second pairs of spaced apart brackets being provided at said upper rail members.

4. A height adjusting device according to claim 3, wherein said first circumferential flange portion of said first supporting pin is welded to the surface of the one of said rearward linkage members by projection welding, and said second circumferential flange portion of said second supporting pin is welded to the surface of the second of said rearward linkage members by projection welding.

* * * * *